United States Patent
Shim

(10) Patent No.: US 10,632,623 B2
(45) Date of Patent: Apr. 28, 2020

(54) ROBOT APPARATUS AND METHOD FOR EXPRESSING EMOTIONS THEREOF

(71) Applicant: Samsung Electronics Co., Ltd., Gyeonggi-do (KR)

(72) Inventor: Jaekyu Shim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 224 days.

(21) Appl. No.: 15/668,332

(22) Filed: Aug. 3, 2017

(65) Prior Publication Data

US 2018/0036887 A1 Feb. 8, 2018

(30) Foreign Application Priority Data

Aug. 3, 2016 (KR) ........................ 10-2016-0099052

(51) Int. Cl.
*B25J 11/00* (2006.01)
*B25J 13/00* (2006.01)
*G06N 3/00* (2006.01)
*G06F 19/00* (2018.01)

(52) U.S. Cl.
CPC .......... *B25J 11/0015* (2013.01); *B25J 11/001* (2013.01); *G06N 3/008* (2013.01); *B25J 13/00* (2013.01); *G06F 19/00* (2013.01); *G06N 3/00* (2013.01)

(58) Field of Classification Search
CPC ....... B25J 11/0015; B25J 13/00; G06N 3/008; G06N 3/00; G06F 19/00
See application file for complete search history.

(56) References Cited

U.S. PATENT DOCUMENTS

| 6,175,772 B1* | 1/2001 | Kamiya | G06N 3/008 700/31 |
| 6,934,604 B1* | 8/2005 | Sabe | A63H 11/00 700/245 |
| 2002/0183896 A1* | 12/2002 | Ogure | A63H 11/00 700/245 |
| 2005/0267631 A1* | 12/2005 | Lee | G05D 1/0253 700/245 |
| 2012/0185095 A1 | 7/2012 | Rosenstein et al. | |
| 2015/0088310 A1 | 3/2015 | Pinter et al. | |

FOREIGN PATENT DOCUMENTS

JP 2015141700 8/2015
KR 1020160019540 2/2016

* cited by examiner

*Primary Examiner* — Stephen Holwerda
(74) *Attorney, Agent, or Firm* — The Farrell Law Firm, P.C.

(57) ABSTRACT

A robot apparatus and a method for expressing emotions thereof, the method including determining motor movement information to drive a motor according to the emotional state to be expressed by the electronic device, determining the display position of the image object on the display according to the movement information of the motor, controlling an operation to drive the at least one motor according to the movement information of the motor, and changing the position of the image object displayed on the display in response to the movement of the electronic device driven by the at least one motor based on the determined display position information.

18 Claims, 10 Drawing Sheets

ROBOT APPARATUS AND METHOD FOR EXPRESSING EMOTIONS THEREOF

PRIORITY

This application claims priority under 35 U.S.C. § 119(a) to a Korean Patent Application filed in the Korean Intellectual Property Office on Aug. 3, 2016 and assigned Serial No. 10-2016-0099052, the contents of which are incorporated herein by reference.

BACKGROUND

1. Field of the Disclosure

The present disclosure relates generally to a robot apparatus, and more particularly, to a method for expressing emotions of a robot apparatus.

2. Description of the Related Art

Electronic robots are being developed that can not only perform physical labor on behalf of human beings, but also recognize human emotional intelligence to mentally interact with human beings. The combination of social network services, big data analysis and robot technologies has enabled development of emotional robots (or social robots) that can efficiently and accurately perform actions inferred from human behavior and can communicate and interact according to human emotions and situations.

An emotional apparatus is generally configured to include a sensor unit to monitor and detect a change in the surrounding environment and, a processor to determine a reaction system corresponding to the change, and a motor system to change the apparatus based on the determined reaction system.

Such a motor system can be classified into a general-purpose motor that controls the movement and operation of the robot apparatus, and a face motor that controls the sympathy, inspiration, and emotion of the robot apparatus. Recently, a social robot has been developed not only to display a screen corresponding to an emotion through a display, but also to physically express the feelings of the robot by controlling movement of the robot head using a face motor.

As the user perceives the emotion of the robot additionally through the movement of the robot head, the user's perception of the robot emotion increases when the movement of the robot head changes rapidly and at a large angle. However, to move the robot head a substantial amount, it is necessary to use a motor having a large rotational force, or a sizeable torque. Such a motor tends to be heavy and expensive and may consume a large amount of current, which makes it difficult to mount the motor on a social robot. If a motor with a high gear ratio is used for a motor with a small number of revolutions, the maximum speed will decrease when a gear module is used, undesirably causing increased gear noise.

As such, there is a need in the art for a smaller-sized yet efficient motor to move the robot apparatus, to reduce cost, current consumption, and heat generation.

SUMMARY

Aspects of the present disclosure are to address at least the above mentioned problems and/or disadvantages and to provide at least the advantages described below. Accordingly, an aspect of the present disclosure is to provide a robot apparatus that can make large movements at a reduced cost and a method for expressing emotions of the robot apparatus.

Another aspect of the present disclosure is to provide an emotion expression method enabling the robot apparatus to visually represent an image object moving in the same phase and same direction as the physical motion of the robot apparatus on a display, thereby expanding the view of the user in recognizing the emotional state of the robot apparatus.

According to an aspect of the present disclosure, an electronic device serving as a robot apparatus may include at least one motor mounted inside the electronic device to drive the electronic device using a rotational force, a display to display an image object indicating an emotional state of the electronic device, a processor electrically connected with at least one of the motor and the display, and a memory electrically connected with the processor and storing instructions that, when executed, cause the processor to determine motor movement information to drive the at least one motor according to the emotional state to be expressed by the electronic device, determine a display position of the image object on the display according to the motor movement information, control an operation to drive the at least one motor according to the motor movement information, and change a display position of the image object displayed on the display in response to the movement of the electronic device driven by the at least one motor based on the determined display position.

According to another aspect of the present disclosure, a method for expressing emotions of an electronic device includes determining motor movement information for motor driving according to an emotional state to be expressed by the electronic device, determining display position information of an image object to be displayed on the display of the electronic device according to the motor movement information, driving at least one motor embedded in the electronic device according to the motor movement information, and changing a display position of the image object displayed according to an emotional state of the electronic device on the display in response to a movement of the electronic device driven by the at least one motor.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
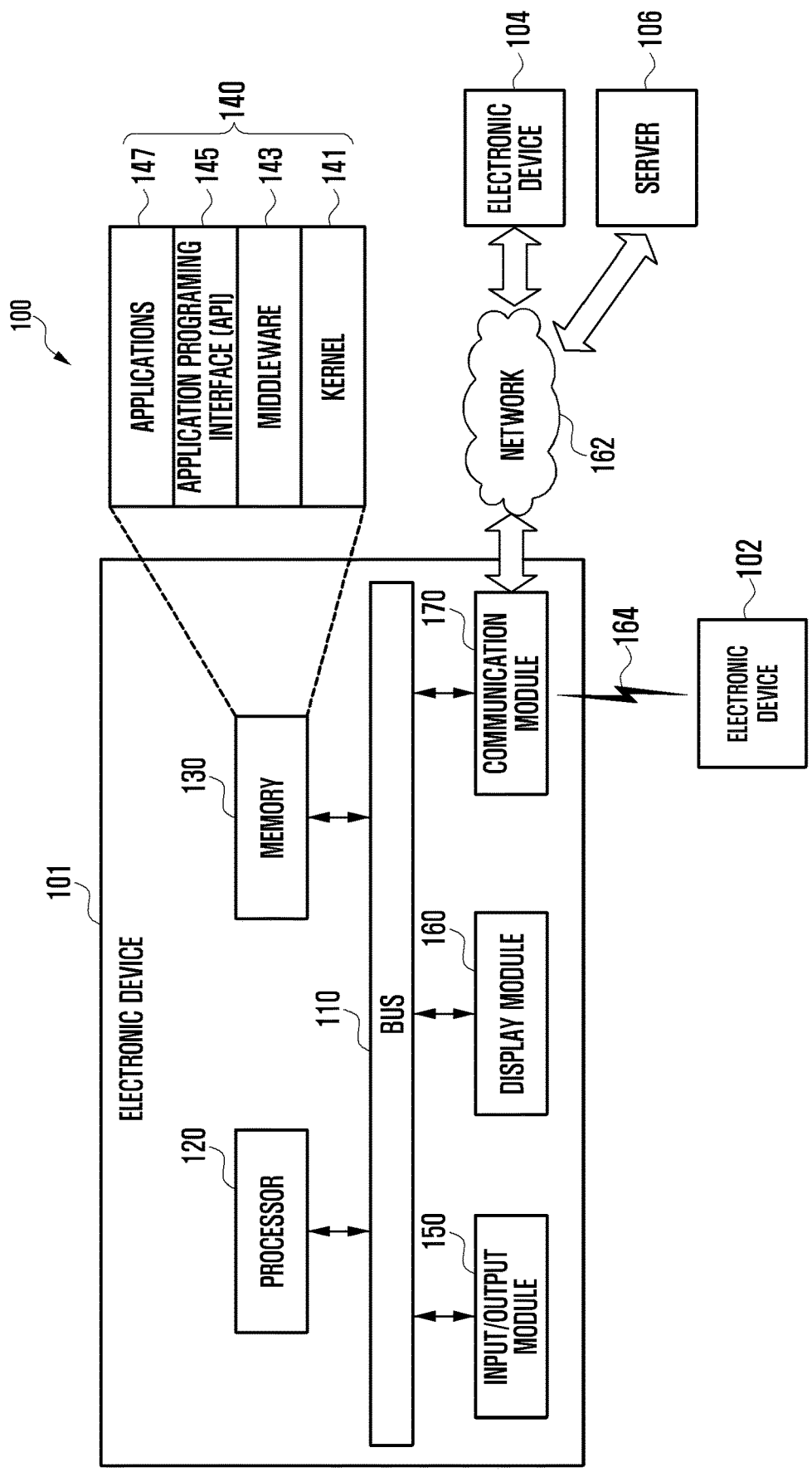
FIG. 1 illustrates a network environment including electronic devices according to embodiments of the present disclosure.

The following description with reference to the accompanying drawings is provided to assist in a comprehensive understanding of embodiments of the present disclosure. It includes various details to assist in that understanding, but those of ordinary skill in the art will recognize that various changes and modifications of the embodiments described herein can be made without departing from the spirit and scope of the present disclosure. In addition, descriptions of well-known functions and constructions may be omitted for the sake of clarity and conciseness.

In the present disclosure, expressions including ordinal numbers, such as "first" and "second", may modify various elements, but such elements are not limited by the above expressions. For example, the above expressions do not limit the sequence and/or importance of the elements, and are used merely for the purpose of distinguishing an element from the other elements. For example, a first user device and a second user device indicate different user devices, although both are user devices. A first element could be referred to as a second element, and similarly, a second element could be referred to as a first element without departing from the scope of the present disclosure.

The electronic device corresponds to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, such as moving picture experts group phase 1 or phase 2 (MPEG-1 or MPEG-2) audio layer 3 (MP3) player), a mobile medical device, a camera, and a wearable device such as a head-mounted-device (HMD) including electronic eyeglasses, electronic clothing, an electronic bracelet, an electronic necklace, an appcessory, an electronic tattoo, or a smart watch.

The electronic device according to the embodiments of the present disclosure may also be a smart home appliance, including a television (TV), digital video versatile disc (DVD) player, audio system, refrigerator, air-conditioner, cleaning device, oven, microwave oven, washing machine, air cleaner, set-top box, TV box, such as Samsung HomeSync™, Apple TV™, or Google TV™, game console, electronic dictionary, electronic key, camcorder, or electronic album.

The electronic device according to the embodiments of the present disclosure may also include medical devices, such as a magnetic resonance angiography (MRA) device, magnetic resonance imaging (MRI) device, computed tomography (CT) device, scanning machine, or ultrasonic scanning device, a navigation device, global positioning system (GPS) receiver, event data recorder (EDR), flight data recorder (FDR), vehicle infotainment device, electronic equipment for ships, such as navigation equipment or gyrocompass, avionics, a security device, a head unit for vehicles, an industrial or home robot, an automated teller machine (ATM), or a point of sales (POS) system.

Hereinafter, electronic devices according to embodiments of the present disclosure will be described in detail with reference to the accompanying drawings. In the description, the term 'user' may refer to a person or a device that uses or otherwise controls the electronic device, such as an artificial intelligence electronic device.

In the present disclosure, compared to expressing only the physical motion of the robot apparatus as in the conventional art, the user can recognize greater and more rapid movement by controlling the physical movement of the robot apparatus and the movement of the visual image object, thereby improving the user's experience.

FIG. 1 illustrates a network environment 100 including an electronic device 101 according to an embodiment of the present disclosure. Referring to FIG. 1, the electronic device 101 may include a bus 110, a processor 120, a memory 130, an input/output (I/O) module 150a display module 160, and a communication module 170.

The bus 110 may be a circuit connecting and transmitting communication between the above described components. The processor 120 may receive commands from the other components through the bus 110, analyze the received commands, and execute calculation or data processing according to the analyzed commands. The processor 120 may include at least a central processing unit (CPU), an application processor (AP), and a communication processor (CP).

The memory 130 may store commands or data received from or generated by the processor 120 or other components. The memory 130 may include programming modules 140 such as a kernel 141, middleware 143, an application programming interface (API) 145, and applications 147. Each of the aforementioned programming modules may be implemented by software, firmware, hardware, or a combination of two or more thereof.

The kernel 141 may control or manage system resources used for executing an operation or function implemented by the other programming modules, and may provide an interface for accessing individual components of the electronic device 101 from the middleware 143 other modules that controls or manage the components.

The middleware 143 may perform a relay function of allowing the API 145 or the applications 147 to communicate with the kernel 141 to exchange data. In operation requests received from the applications 147, the middleware 143 performs a control for operation requests, such as scheduling or load balancing, by using a method of assigning a priority, by which system resources of the electronic device 101 can be used, to the applications 147.

The API 145 is the interface for the applications 147 that controls the function provided by the kernel 141 or the middleware 143 and may include at least one interface or function for file, window, image, or text control.

The input/output interface 150 may receive a command or data as input from a user via an input/output apparatus, such as a sensor, keyboard, or touchscreen, may deliver the received command or data to the processor 120 or the memory 130 through the bus 110, and may display a video, image, or data to the user.

The display module 160 may be a liquid crystal display (LCD) and an active matrix organic light emitting diode (AM-OLED) display, microelectromechanical systems (MEMS), or electronic paper display, may include the touch panel and one module, and may display the received information, such as multi-media or text data, from the above-described elements.

The communication module 170 may connect communication between the electronic device 101 and the external device, such as by accessing a network 162 through wireless or wired communication to communicate with the external device. The wireless communication may include at least one of WiFi, Bluetooth® (BT), near field communication (NFC), a global positioning system (GPS), and cellular communication, such as long term evolution (LTE), LTE-Advanced (LTE_A), code division multiple access (CDMA), wideband CDMA (WCDMA), universal mobile telecommunications system (UMTS), wireless broadband (WiBro) or global system for mobile communications (GSM). The wired communication may include at least one of a universal serial bus (USB), a high definition multimedia interface (HDMI), recommended standard 232 (RS-232), and a plain old telephone service (POTS). The wireless communication may include GNSS, i.e., at least one of a global positioning system (GPS), global navigation satellite system (Glonass), Beidou navigation satellite system (Beidou) or Galileo, the European global satellite-based navigation system. According to an embodiment, the network 162 may be a telecommunication network including at least one of a computer network, the Internet, Internet of things (IoT), and a telephone network.

Each of the first and second external electronic devices 102 and 104 may be the same or a different type of device as the electronic device 101. In embodiments, all or part of the operations performed on the electronic device 101 may be performed on one or more other electronic devices. When the electronic device 101 has to perform a specific function or service automatically or upon request, instead of or in addition to directly executing the function or service, the electronic device 101 may request a different electronic device to perform an additional function associated with the function or service. The different electronic device may execute the requested or additional function and return the result to the electronic device 101, which may directly or additionally process the received result to provide the requested function or service. To this end, technologies such as cloud, distributed, and client-server computing may be utilized.

Hereinafter, the electronic device of the present disclosure will be described as being a robot apparatus. In the following description, only some components of the robot apparatus are shown for ease of description. The robot apparatus may further include mandatory components not mentioned below for implementation.

Figure 2:
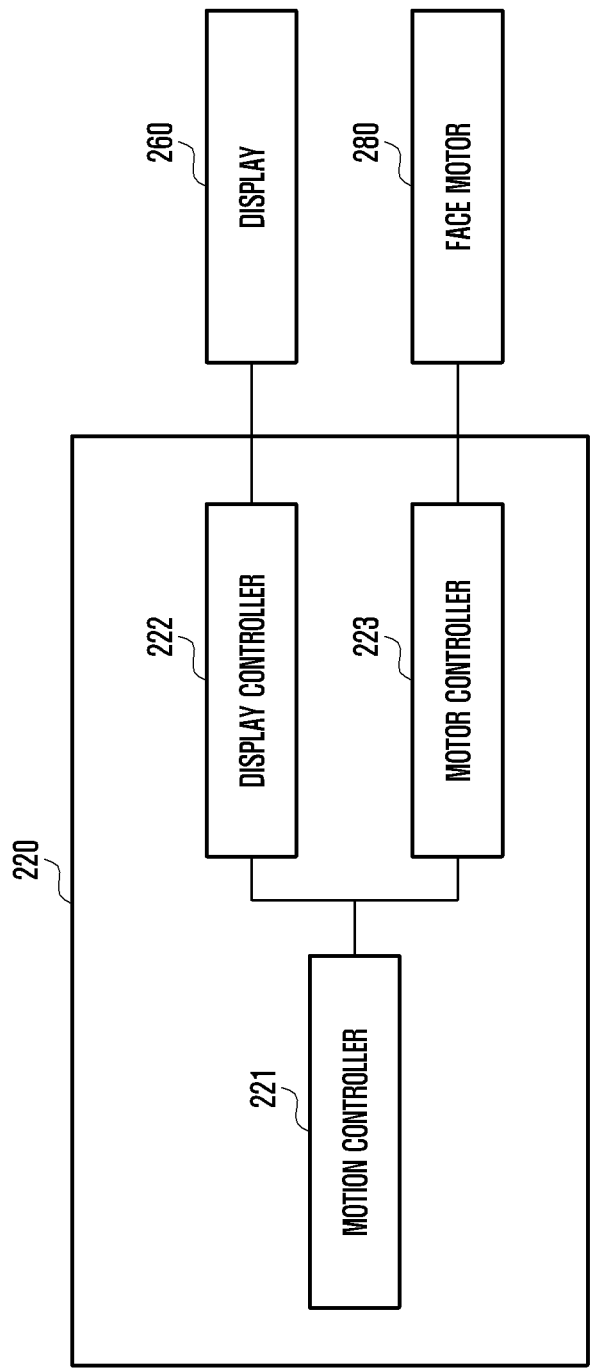
FIG. 2 illustrates a partial configuration of an electronic robot apparatus according to embodiments of the present disclosure.

FIG. 2 illustrates a partial configuration of an electronic robot apparatus according to embodiments of the present disclosure.

Referring to FIG. 2, the electronic robot apparatus may include a processor 220 (e.g., the processor 110 illustrated in FIG. 1), a display 260, and a face motor 280. In one embodiment, the processor 220 may be configured to include internal components such as a motion controller 221, and a display controller 222 and a motor controller 223 controlled by the motion controller 221.

However, the present disclosure is not limited thereto, and at least one of the internal components may be implemented as a separate entity from the processor 220.

The motion controller 221 may recognize the behavior information of the user based on analysis of at least one piece of sensing information. In one embodiment, the electronic robot apparatus may receive sensing information from various sensors, such as a detection sensor, a camera sensor, an illuminance sensor, a pressure sensor, a direction sensor, a geomagnetic sensor and a microphone to sense the distance to or motion of the user. The electronic robot apparatus may select valid data based on the collected sensing information and recognize the user behavior information, which may include information on the distance to the user, and the position, motion, posture, gesture, or emotion of the user.

The electronic robot apparatus may extract and track major feature points of the face such as eyes, nose, mouth, and eyebrows from user images captured by the image sensor and recognize user emotional information, based on basic facial expressions conveying happiness, surprise, anger, sadness and sorrow.

In addition, the electronic robot apparatus may analyze the user voice acquired through the microphone and recognize user emotional information according to vocal tones of the user.

The electronic robot apparatus may analyze the movement of the body, head, arms, and legs of the user in user images captured by the image sensor to recognize user gesture information such as standing, sitting, nodding, turning, hand waving, walking, hand raising, and greeting.

The electronic robot apparatus may use a touch sensing module to recognize user behavior information such as accessing, touching or stroking the surface of the electronic robot apparatus.

The electronic robot apparatus may construct a depth map for the surrounding space based on image information obtained through a position estimation sensor or image sensor, and recognize the position information of the user by estimating the position between the user and the electronic robot apparatus in the depth map. In this case, the electronic robot apparatus may produce information on the distance between the user and the electronic robot apparatus.

The electronic robot apparatus may store pieces of feature information necessary for recognizing user behavior information from information collected from various sensors in the storage unit. To identify a specific user, the electronic robot apparatus may store user identification information, such as face, voice, and body characteristics, emotion criterion information, and gesture criterion information in the storage unit.

The motion controller 221 may receive user behavior information analyzed from the attention system, analyze the user behavior information by selecting valid data based on sensing information transmitted from various sensor units, and determine the emotional state to be expressed by the electronic robot apparatus in response to the user behavior information. The emotional states to be expressed by the electronic robot apparatus may correspond to anger, disgust, sadness, interest, happiness, impassiveness, surprise, agreement (i.e., "yes"), and rejection (i.e., "no"). However, the present disclosure is not limited thereto, and the emotional states to be expressed by the electronic robot apparatus may be varied according to setting values.

The motion controller 221 may generate an emotional motion command corresponding to the determined emotional state. The emotional motion command may be given as an emotional expression value that controls the physical movement of the robot head, and an emotional expression value associated with the emotional expression of an object to be displayed on the display.

To express emotional states, the electronic robot apparatus may store motion information of the head predefined for each emotional state in the storage unit. The head motion information may include head motion type, angle, speed (or rotational force), and direction. For example, the electronic robot apparatus may store data in advance for emotional expression values indicating emotional states of anger, sadness, and happiness.

The motion controller 221 may retrieve an emotional expression value corresponding to a determined emotional state from the storage unit and control an operation to process the emotional expression value as a command.

The motion controller 221 may control the display controller 222 and the motor controller 223 by sending a generated emotional motion command thereto. The display controller 222 may control the display mounted on the head of the electronic robot apparatus, and the motor controller 223 may control the face motor mounted on the head of the electronic robot apparatus.

The motion controller 221 may send the display controller 222 an emotional expression value so that the location information of the image object to be displayed on the display is changed in response to the robot head motion corresponding to the emotional state. The image object may be a facial image object capable of representing an emotional expression, but the present disclosure is not limited thereto. In case of a light-emitting diode (LED) display, the image object may be implemented as an object capable of expressing emotions such as a facial expression through LED position control. In this case, the motion controller 221 can express emotions of the robot apparatus by changing the on/off state of the LEDs through LED position control.

The motion controller 221 may predict the movement of the robot head driven by the face motor, calculate the display coordinates of the image object so that the image object on the display moves in the same manner as, or identically to, the predicted robot head movement, and transmit an emotional motion command including the display coordinates to the display controller 222.

The motor controller 223 may control the head movement of the electronic robot apparatus by controlling the face motor according to an emotional motion command sent by the motion controller 221, and may control the speed, angle, and rotation axis movement of the motor so as to physically move the head of the robot apparatus. For example, the motor controller 223 may control the face motor to express various head motions with respect to the rotation axis of the robot head, such as movement in the clockwise and counterclockwise direction, horizontal and vertical reciprocating movement, left and right movement, and horizontal and vertical composite circular movement.

The display controller 222 may identify the display position of the image object indicating the emotional state based on an emotional motion command received from the motion controller 221 and control display of the image object, which may be presented in a two-dimensional (2D) form or a three-dimensional (3D) form.

The display controller 222 may control an operation to display the object differently according to the emotional state represented by the electronic robot apparatus. For example, when the object is an icon, character, or facial expression image representing a facial expression change, the display controller 222 may control an operation to display an angry facial expression for the "angry" state, a sad facial expression for the "sad" state, and a happy facial expression for the "happy" state on the display.

The display controller 222 may cause the object representing the facial expression change to be displayed in the central region of the display by default, may determine the display position of the object to be output on the display based on the direction of movement of the face motor, and may change the display position of the object according to the speed and direction of movement of the robot head caused by the face motor.

For example, when the emotional expression value for movement of the face motor indicates a left-right reciprocating action, the display controller 222 may change the display position of the object so that the object is moved in the left-right direction according to the direction and speed of movement of the face motor. As another example, when the face motor causes the electronic robot apparatus to move to the left, the display controller 222 may control display of the object so that the object is moved from the central or right region, to the left region. As another example, when the face motor causes the electronic robot apparatus to move to the right, the display controller 222 may control display of the object so that the object is moved from the central or left region, to the right region. As such, the electronic robot apparatus may control display of the object on the display so that the object is moved in the same speed and direction as the robot head, expanding the view of the user.

Figure 3:
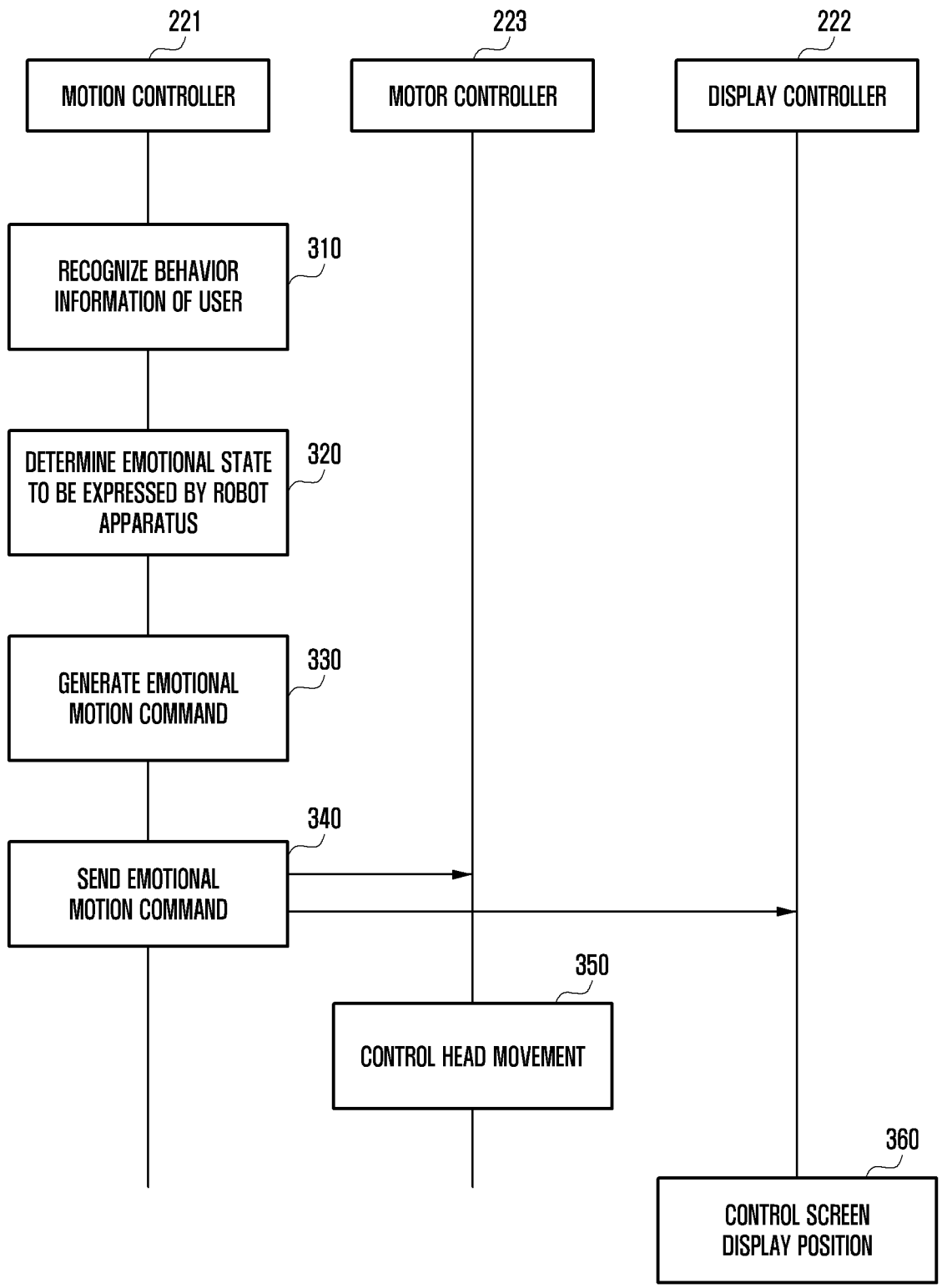
FIG. 3 illustrates a method for expressing emotions of the electronic robot apparatus according to embodiments of the present disclosure.

FIG. 3 illustrates a method for expressing emotions of the electronic robot apparatus according to embodiments of the present disclosure.

Referring to FIG. 3, at step 310, the motion controller 221 of the electronic robot apparatus may recognize the behavior information of the user, which may include information on the distance to the user, and the position, motion, posture, gesture, or emotion of the user.

In step 320, the motion controller 221 may determine the emotional state to be expressed by the electronic robot apparatus in response to the user behavior information. In step 330, the motion controller 221 may generate an emotional motion command corresponding to the determined emotional state. The emotional motion command may be given as an emotional expression value for controlling the physical movement of the robot head, and an emotional expression value associated with the emotional expression of an object to be output on the display.

In step 340, the motion controller 221 may send the emotional motion command to the display controller 222 and the motor controller 223. In step 350, the motor controller 223 may drive the face motor to physically move the robot head according to the emotional expression value corresponding to the emotional motion command. For example, the motor controller 223 may drive the face motor to cause the robot head to express various head motions, such as horizontal reciprocating movement, vertical reciprocating movement, left and right movement, and horizontal and vertical composite circular movement.

In step 360, the display controller 222 may control the display position of the image object on the display according to the emotional expression value corresponding to the emotional motion command reflecting the user behavior information. The display controller 222 may control display of the image object that makes an angry facial expression for the "angry" state, a sad facial expression for the "sad" state, and a happy facial expression for the "happy" state on the display, and may control the display position of the object on the display so that the object is moved in the same speed and direction as the robot head moved by the face motor.

Figure 4A:
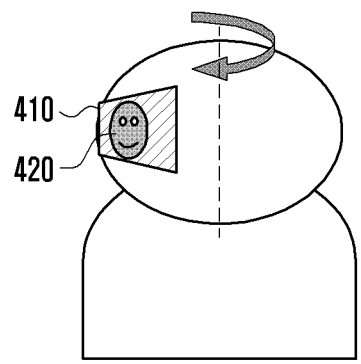
FIGS. 4A, 4B and 4C illustrate interaction between the user and the electronic robot apparatus according to embodiments of the present disclosure.
Figure 4B:
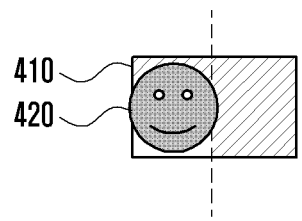
Figure 4C:
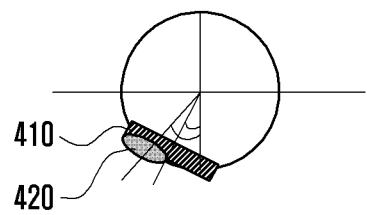
Figure 5A:
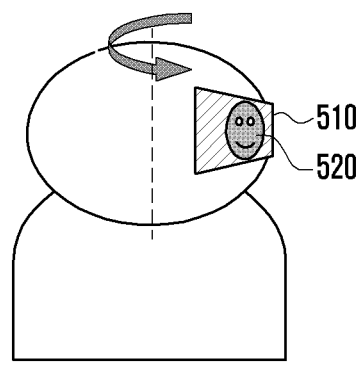
FIGS. 5A, 5B and 5C illustrate movement of the electronic robot apparatus according to embodiments of the present disclosure.
Figure 5A:
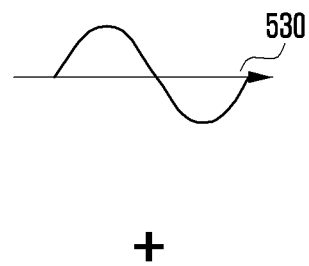
Figure 5B:
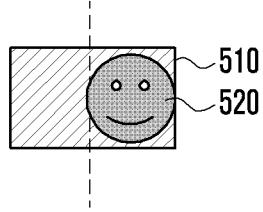
Figure 5B:
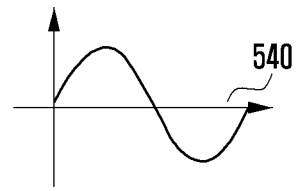
Figure 5C:
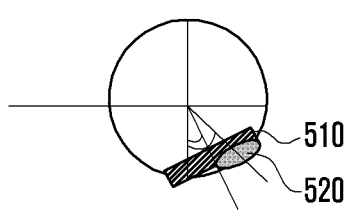
Figure 5C:
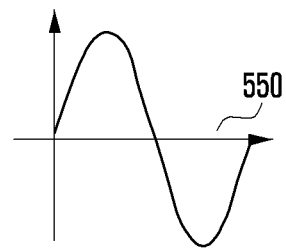

FIGS. 4A, 4B and 4C illustrate interaction between the user and the electronic robot apparatus according to embodiments of the present disclosure, and FIGS. 5A, 5B and 5C illustrate movement of the electronic robot apparatus according to embodiments of the present disclosure.

Referring to FIGS. 4A, 4B, 4C and 5A, 5B and 5C, the user and the electronic robot apparatus may be positioned facing each other for mutual interaction. The electronic robot apparatus may be configured to include a body for supporting the electronic robot apparatus, and a robot head that is coupled with the body and has an internally-mounted face motor for representing emotions as physical motion. A display 410 for outputting an image object 420 representing emotions as an image may be mounted on the robot head.

For example, a face image object may be displayed in the central region of the display 410. In general, to express the motion of the robot head using a face image object on the display, a display having an area large enough to move the image object left and right is required. For example, if the face image object is displayed at a size of about ⅔'s of the display size, the movement of the image object perceived by the user may be small even if the image object is moved left and right. Hence, to represent motion of the face image object, the display mounted on the electronic robot apparatus needs to be larger than the size of the face image object. The larger the size of the display, the greater the movement of the face image object can be represented. When such a large-sized display is mounted, the weight of the display conventionally increases since the display requires a heavy motor having a high gear ratio for driving the robot head, which also increases cost.

In embodiments of the present disclosure, however, the robot electronic device can maximize the motion effect by controlling the visual motion and the physical motion in an associated manner. For example, upon determining that the emotional state to be expressed by the electronic robot apparatus is rejection, the motion controller may transmit an emotional expression value corresponding to the rejection state to the display controller and the motor controller. The motion controller may drive the face motor by using the emotional expression value corresponding to the rejection state to cause a left and right reciprocating motion. Specifically, as shown in FIG. 4A, the motor controller may repeat the operation of moving clockwise and then moving counterclockwise with respect to the rotation axis as shown in FIG. 5A here, the left and right reciprocating motion can have a constant speed.

The display controller can change the position of the image object 420 to the left and right on the display 410 based on movement of the face motor. For example, when the robot head moves in the clockwise direction with respect to the rotation axis as shown in FIGS. 4A and 4C, the display controller can change the display position of the image object 420 from the central region to the left region in the same direction as the movement direction of the robot head as shown in FIG. B. On the other hand, as shown in FIG. 5A, when the robot head moves in the counter clockwise direction with respect to the rotation axis, the display controller can control the display 510 to change the display position of the image object 520 from the left region to the right region.

Assuming that the motion of the robot head and the motion of the image object are represented by sine curves, the motion of the physical robot head can be represented by a sine curve 530 having a first amplitude and a first phase, as illustrated in FIG. 5A. The motion of the visual image object 520 can also be represented by a sine curve 540 having the first amplitude and the first phase, as illustrated in FIG. 5B. As the electronic robot apparatus moves the display position of the image object in the same speed and direction as the motion of the robot head, the amount of movement of the robot head and the image object are summed, and the motion of the robot apparatus perceived by the user in terms of the visual field may be represented by a sine curve 550 having the first phase and a second amplitude greater than the first amplitude, as illustrated in FIG. 5C. That is, the movement of the robot head may be perceived by the user as being relatively larger compared with moving the robot head alone.

Figure 6:
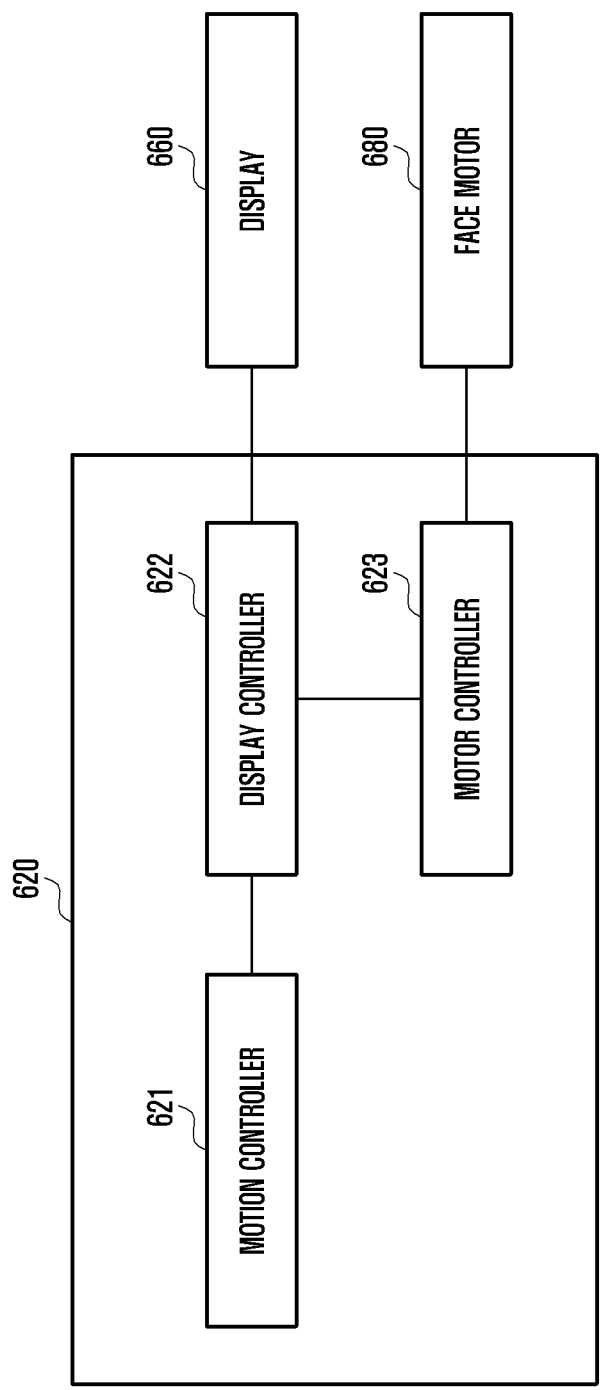
FIG. 6 illustrates a partial configuration of an electronic robot apparatus according to embodiments of the present disclosure.

FIG. 6 illustrates a partial configuration of an electronic robot apparatus according to embodiments of the present disclosure.

Referring to FIG. 6, the electronic robot apparatus may include a processor 620, a display 660, and a face motor 680. The processor 620 may be configured to include a motion controller 621, a motor controller 623 controlled by the motion controller 621, and a display controller 622 controlled by the motor controller 623.

The motion controller 621 may recognize the behavior information of the user based on analysis of at least one piece of sensing information. The user behavior information may include information on the distance to the user, and information on the position, motion, posture, gesture, or emotion of the user.

The motion controller 621 may determine the emotional state to be expressed by the electronic robot apparatus in response to the user behavior information, and may generate an emotional motion command corresponding to the determined emotional state, as emotional state information and an emotional expression value controlling the physical movement of the robot head. For example, the emotional motion command may include an emotional expression value indicating head motion type, head movement angle, and head movement speed (or rotational force).

The motion controller 621 may control the motor controller 623 by sending a generated emotional motion command thereto. The motor controller 623 may control the head movement of the electronic robot apparatus by controlling the face motor according to an emotional motion command sent by the motion controller 621, and may control the speed, angle, and movement direction of the motor so as to physically move the head of the robot apparatus.

The motor controller 623 may send movement information of the motor head to the display controller 622, such as information on the speed, angle, and movement direction of the motor.

The motor controller 623 may control an operation so that transmitting motor head movement information to the display controller 622 and controlling the face motor can be performed in parallel or in sequence.

The display controller 622 may receive the movement information of the motor head from the motor controller 623 and analyze the display position of the image object to be output on the display based on the received movement information of the motor head.

The display controller 622 may calculate the display coordinates of the image object so that the image object being displayed is moved in the same speed and direction as the robot head based on the movement information of the motor head, and may control the display to move the image object being displayed in the same speed and direction as the movement of the face motor based on the calculated display coordinates.

Figure 7:
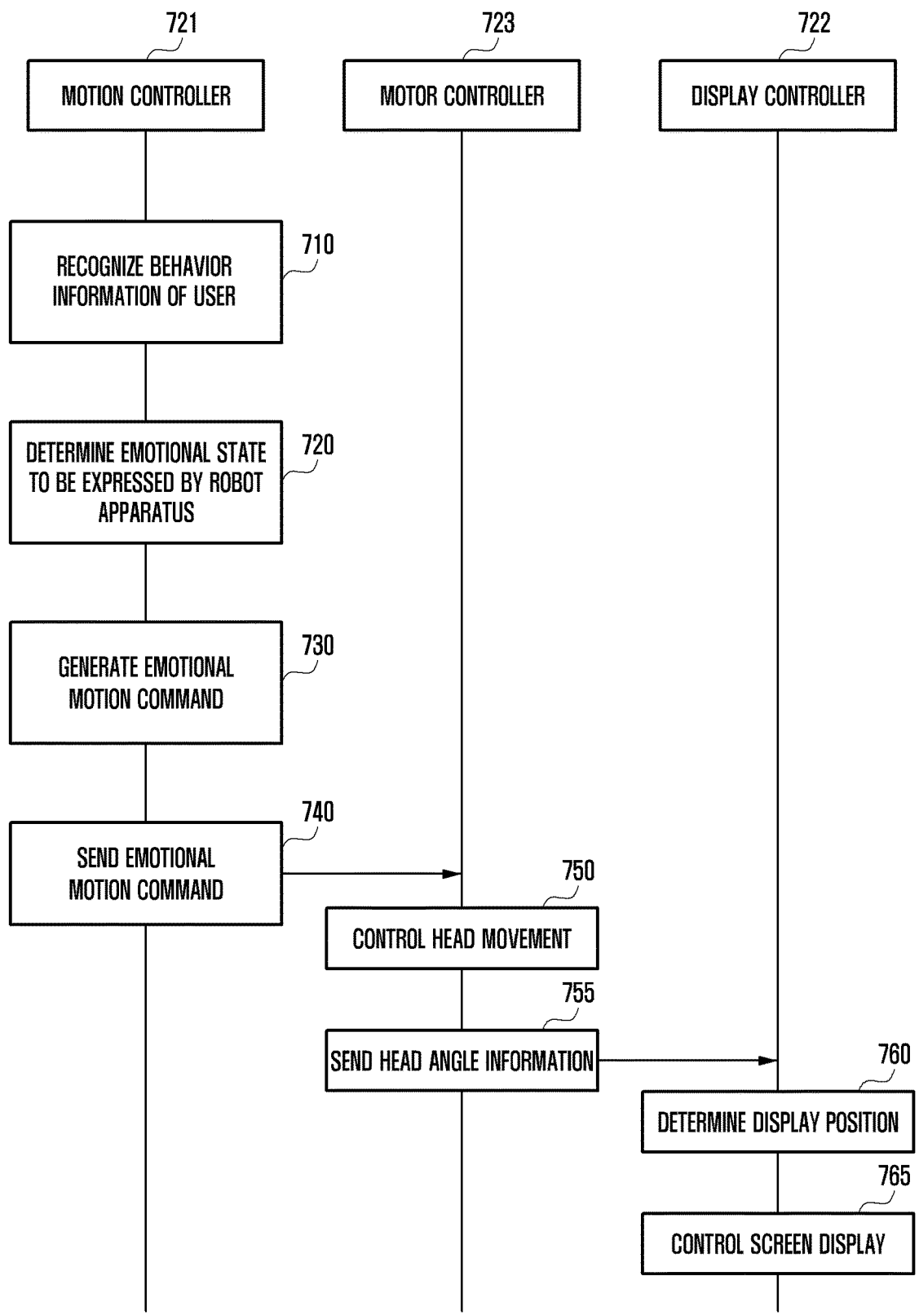
FIG. 7 illustrates a method for expressing emotions of the electronic robot apparatus according to embodiments of the present disclosure.

FIG. 7 illustrates a method for expressing emotions of the electronic robot apparatus according to embodiments of the present disclosure.

Referring to FIG. 7, in step 710, the motion controller 721 of the electronic robot apparatus may recognize the behavior information of the user. The user behavior information may include information on the distance to the user, and information on the position, motion, posture, gesture, or emotion of the user. In step 720, the motion controller 721 may determine the emotional state to be expressed by the electronic robot apparatus in response to the user behavior information. In step 730, the motion controller 721 may generate an emotional motion command corresponding to the determined emotional state. The emotional motion command may be a command based on an emotional expression value associated with the physical movement of the robot head and an emotional expression of the object to be output on the display. In step 740, the motion controller 721 may send the emotional motion command to the motor controller 723 In step 750 the motor controller 723 may control the physical head movement of the electronic robot apparatus by driving the face motor according to the emotional expression value corresponding to the emotional motion command. For example, the motor controller 723 may control the face motor to express various motions of the robot head, such as horizontal reciprocating movement, vertical reciprocating movement, left and right movement, and horizontal and vertical composite circular movement.

In step 755, the motor controller 723 may send movement information of the motor head to the display controller 722. The movement information of the motor head may include information on the speed, angle, and movement direction of the motor. In step 760, the display controller 722 may determine the display position of the image object to be output on the display according to the movement information of the motor head, such as by calculating the display coordinates of the image object so that the image object being displayed is moved in the same speed and direction as the robot head. In step 765, the display controller 722 may control display of the image object so that the image object is moved to the left and right according to the movement direction of the face motor based on the calculated display coordinates.

Figure 8:
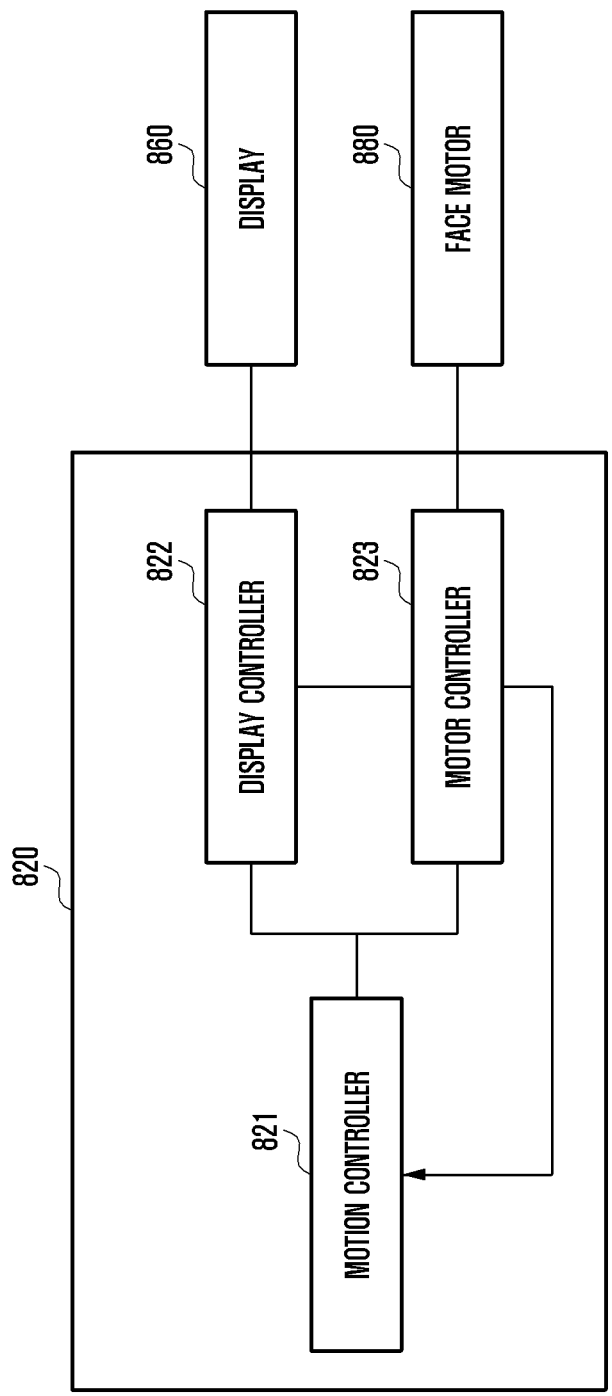
FIG. 8 illustrates a partial configuration of an electronic robot apparatus according to embodiments of the present disclosure.

FIG. 8 illustrates a partial configuration of an electronic robot apparatus according to embodiments of the present disclosure.

Referring to FIG. 8, the electronic robot apparatus may include a processor 820, a display 860, and a face motor 880. The processor 820 may be configured to include a motion controller 821, a display controller 822, and a motor controller 823. The motion controller 821 may control both the display controller 822 and the motor controller 823, or the motion controller 821 may control the motor controller 823, and the motor controller 823 may control the display controller 822.

The motion controller 821 may recognize the behavior information of the user based on analysis of at least one piece of sensing information. The user behavior information may include information on the distance to the user, and information on the position, motion, posture, gesture, or emotion of the user.

The motion controller 821 may determine the emotional state to be expressed by the electronic robot apparatus in response to the user behavior information, and may generate an emotional motion command corresponding to the determined emotional state. The emotional motion command may be given as an emotional expression value controlling the physical movement of the robot head. The motion controller 821 may send the generated emotional motion command to the display controller 822 and the motor controller 823. The display controller 822 may control the display 860 mounted on the robot head, and the motor controller 823 may control the face motor mounted on the robot head.

The motion controller 821 or the display controller 822 may calculate the display coordinates of the image object so that the image object being displayed is moved in the same speed and direction as the robot head based on the movement information of the robot head, such as motor speed, motor angle, or motor movement direction. The display controller 822 may control the display to move the image object being displayed in the same speed and direction as the movement of the face motor based on the calculated display coordinates.

The motor controller 823 may control the movement of the electronic robot apparatus by controlling the face motor according to the emotional motion command sent by the motion controller 821, and may control the speed, angle, and left and right movement direction of the motor so as to physically move the head of the robot apparatus.

The motor controller 823 may monitor the state of the robot head in the course of driving the face motor that controls the movement of the robot head and transmit the monitoring information to the motion controller 821.

The motor controller 823 may determine whether the driving state of the face motor matches the motion information of the motor, and, if the driving state does not match the motion information, notify the motion controller 821 of the driving state of the motor.

Upon reception of driving state information of the motor from the motor controller 823, the motion controller 821 may compute the movement information of the motor head changed according to the driving state of the motor, re-compute the display coordinates of the image object according to the movement information of the motor head, and control the display controller 822 to change the position of the image object to the computed display coordinates.

In one embodiment, when a problem has occurred due to a change in the driving state of the face motor, the motor controller may control the display controller to generate a change in the facial expression of the image object or control the display controller to notify the user of the problem.

Figure 9:
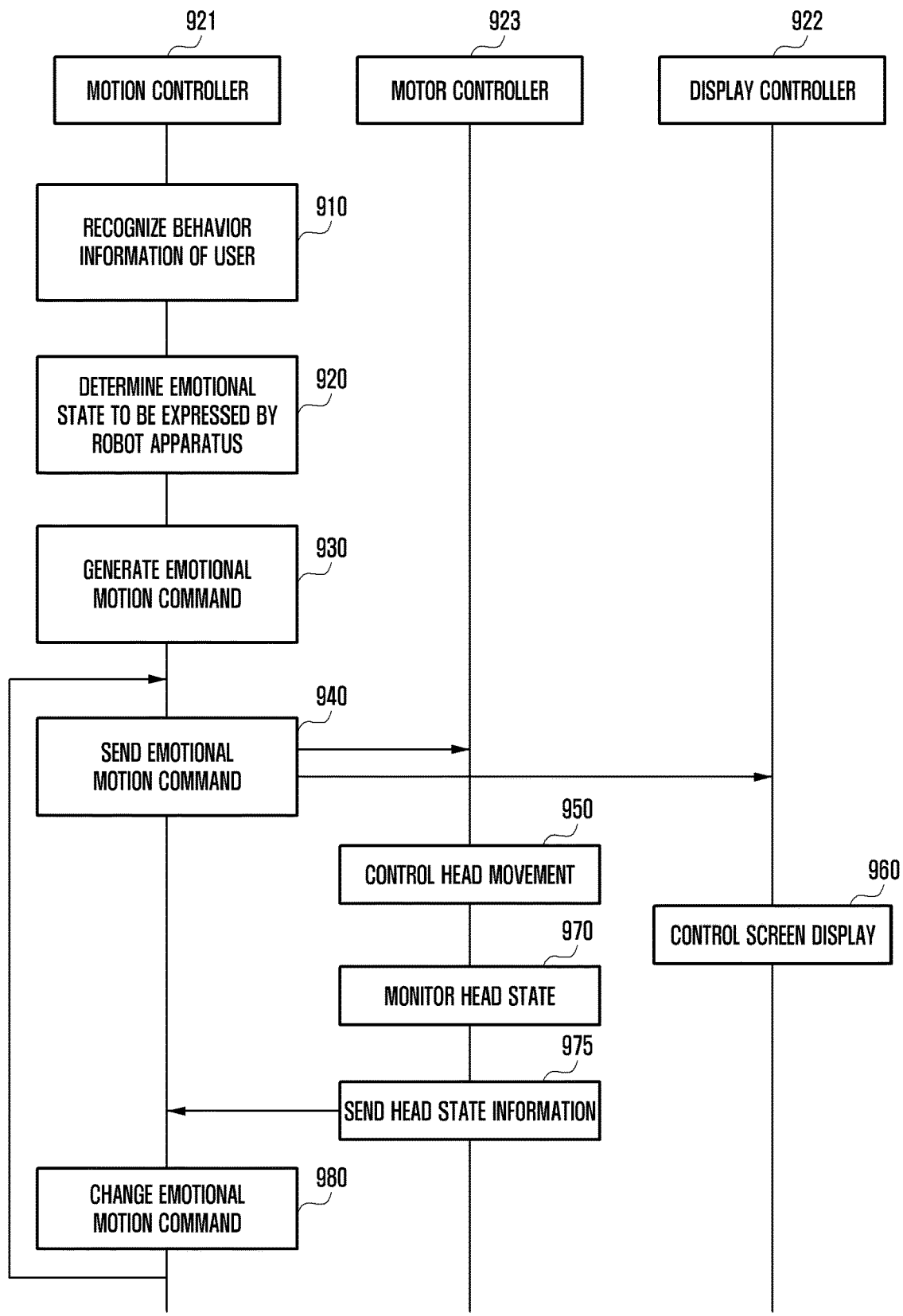
FIG. 9 illustrates a method for expressing emotions of the electronic robot apparatus according to embodiments of the present disclosure.

FIG. 9 illustrates a method for expressing emotions of the electronic robot apparatus according to embodiments of the present disclosure.

Referring to FIG. 9, in step 910, the motion controller 921 of the electronic robot apparatus may recognize the behavior information of the user, such as information on the distance to the user, and information on the position, motion, posture, gesture, or emotion of the user. In step 920, the motion controller 921 may determine the emotional state to be expressed by the electronic robot apparatus in response to the user behavior information. In step 930, the motion controller 921 may generate an emotional motion command corresponding to the determined emotional state. In step 940, the motion controller 921 may send the generated emotional motion command to the display controller 922 and the motor controller 923.

The emotional motion command may include movement information of the motor head indicating the speed, angle, or movement direction of the motor. In step 950, the motor controller 923 may physically control the movement of the robot head by driving the face motor. In step 960, the display controller 922 may change the position of the image object to the left and right on the display according to the movement direction of the face motor based on the computed display coordinates.

In step 970, the motor controller 923 may monitor whether the driving state of the face motor matches the motion information of the face motor. If the driving state of the face motor does not match the motion information thereof, in step 975, the motor controller 923 may notify the motion controller 921 of the driving state of the face motor. For example, when an emotional expression value is received from the motion controller 921 for a movement leftward with an angle of 60 degrees and gear 2, the motor controller 923 may drive the face motor according to the received emotional expression value. However, in comparison to the motor control command, the face motor may actually be driven leftward with an angle of 40 degrees and gear 1 due to poor conditions of the face motor and foreign substances caught therein. The motor controller 923 may convert the movement of the face motor into a specific value and may determine whether the face motor moves in the same manner as indicated by the control command based on the converted value.

At step 980, the motion controller 921 may compute the movement information of the motor head changed according to the driving state of the motor, re-compute the display coordinates of the image object according to the movement information of the motor head, and update the emotional motion command so as to change the position of the image object to the computed display coordinates. Thereafter, the procedure may return to step 940.

Figure 10:
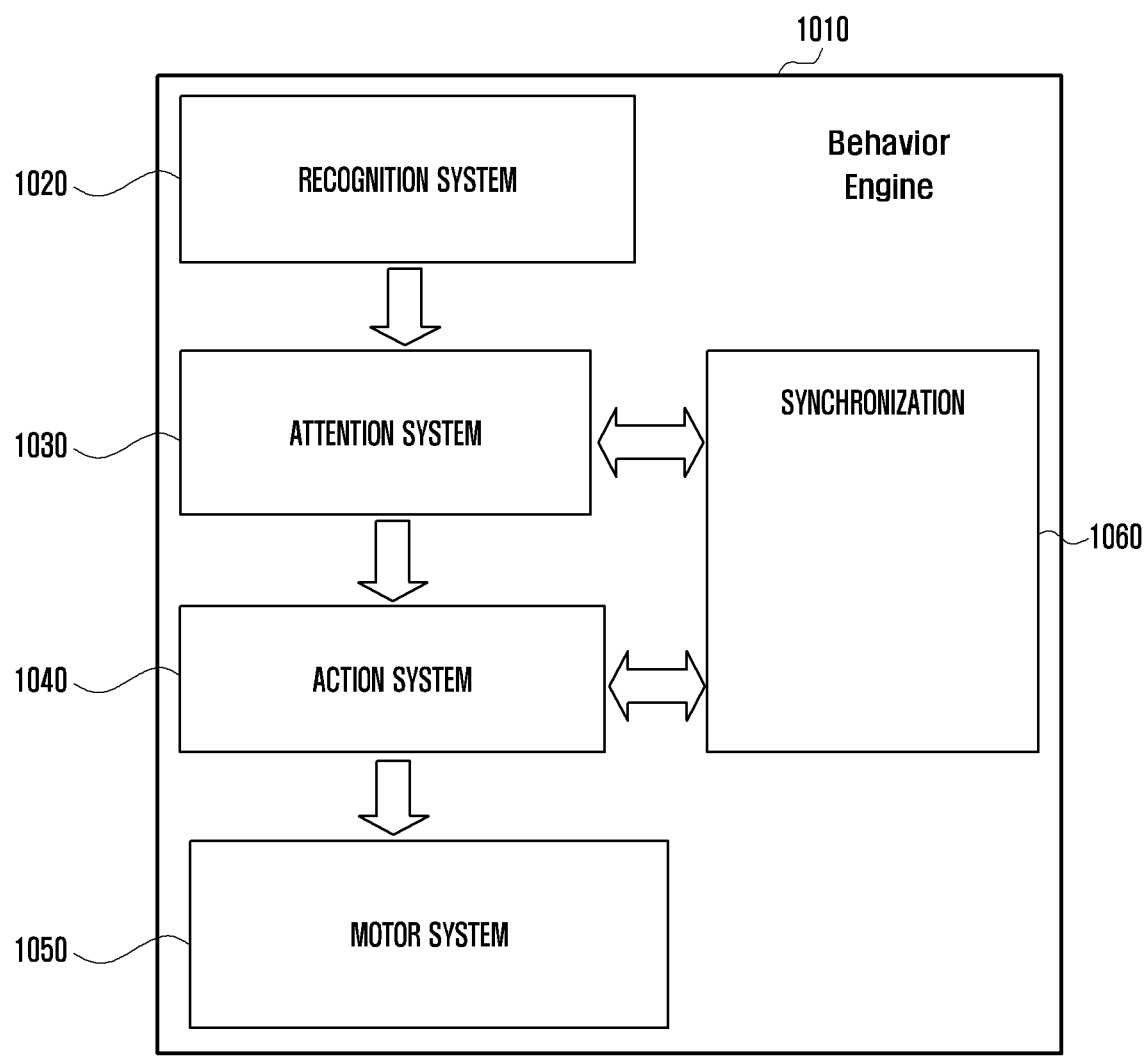
FIG. 10 illustrates the software architecture of the electronic robot apparatus according to embodiments of the present disclosure.

FIG. 10 illustrates the software architecture of the electronic robot apparatus according to embodiments of the present disclosure.

Referring to FIG. 10, the electronic robot apparatus may include a behavior engine 1010 for interaction with the user, including a recognition system 1020 that collects sensing information from one or more sensors, an attention system 1030 that extracts valid data from the collected sensing information and recognize the valid data as user behavior information, a synchronization system 1060 that maps the emotional state to be expressed to an emotional expression value according to the user behavior information, an action system 1040 that receives a command as an emotional expression value, and a motor system 1050 that controls driving of at least one motor.

In the present disclosure, the word "module" may refer to a software component, a hardware component, a firmware component or a combination thereof, and may be used interchangeably with "unit", "logic", "logical block", "component", "circuit" or the like. A module may be a smallest element or a part thereof acting as a single entity or supporting one or more functions, and may be implemented mechanically or electronically, such as by using at least one of an application-specific integrated circuit (ASIC), a field-programmable gate array (FPGA) and a programmable-logic device (PLD), known to have a specific function or to be developed in the future. At least a part of the device or the method according to embodiments may be implemented as instructions in a program module, which can be stored in a computer readable storage medium. When the instructions are executed by a processor, the processor may perform functions corresponding to the instructions. The computer readable storage media may include magnetic media such as a hard disk and floppy disk, optical media such as a compact disc read-only memory (CD-ROM) and digital versatile disk (DVD), magneto-optical media such as a floptical disk, and memory devices. The instructions may include codes produced by compilers and codes executable through interpreters. A module or program module may include at least one of the components described above. An existing component of the module may be removed or a new component may be added to the module. Operations supported by a module, program module, or another component may be performed in sequence, in parallel, by repetition, or heuristically. Some operations may be executed in a different order or may be omitted, and at least one new operation may be added.

While the present disclosure has been shown and described with reference to embodiments thereof, it will be apparent to those of ordinary skill in the art that various changes in form and detail may be made thereto without departing from the spirit and scope of the present disclosure as defined by the appended claims.

What is claimed is:

1. A robot electronic device comprising:
   a display configured to display an image object representing an emotion;
   at least one motor mounted inside the electronic device and configured to move a portion which disposed the display in the electronic device using a rotational force; and
   a processor configured to:
   recognize user behavior information based on sensing information;
   identify emotion information to be expressed by the robot electronic device based on the user behavior information;
   control the display to display the image object having the emotion information
   determine motor motion information generated to control a movement of the display according to the emotion information;
   identify a display region of the image object displayed on the display corresponding to the motor motion information;
   adjust an operation of the at least one motor according to the motor motion information; and
   change the display region of the image object displayed on the display in response to the movement of the at least one motor.

2. The electronic device of claim 1, wherein the processor comprises:
   a motor controller configured to control the at least one motor;
   a display controller configured to control the display; and
   a motion controller configured to control the motor controller and the display controller,
   wherein the motion controller is configured to determine the motor motion information for driving the motor according to the emotion information to be expressed by the robot electronic device and sends the motor motion information to the motor controller,
   wherein the motion controller is configured to determine the display region of the image object and sends display position information to the display controller,
   wherein the motor controller is configured to drive the at least one motor according to the motor motion information sent by the motion controller, and
   wherein the display controller is configured to change the display region of the image object displayed on the display in response to the motor motion based on the display position information sent by the motion controller.

3. The electronic device of claim 1, further comprising a sensor unit including at least one sensor,
   wherein the processor is configured to recognize the user behavior information by analyzing sensing information collected through the sensor unit in consideration of a distance from the electronic device to a user interacting with the electronic device, a position of the user, a motion of the user, a posture of the user, a gesture of the user, or an emotional state of the user, and determines the emotional state in response to the user behavior information.

4. The electronic device of claim 2, wherein the motor controller is configured to control a speed, an angle, and a rotation axis direction of the motor based on the motor motion information to physically move the electronic device, and
wherein the display controller is configured to control the display to change the display region of the image object identically along the movement of the electronic device moved by the at least one motor.

5. The electronic device of claim 1, wherein the processor is configured to calculate the display coordinates of the image object based on an identical speed and direction corresponding to the electronic device moved by the at least one motor.

6. The electronic device of claim 2, wherein the image object comprising a facial image or facial expression image indicating an emotional expression corresponding to the determined emotion information of the electronic device, or expresses emotions through a light-emitting diode on/off position control.

7. The electronic device of claim 1, wherein the processor comprises:
a display controller configured to control the display;
a motor controller configured to control the display controller and the at least one motor; and
a motion controller configured to control the motor controller,
wherein the motion controller is configured to determine motor motion information for moving the at least one motor according to the emotion information to be expressed by the electronic device, send the motor motion information to the motor controller, and move the at least one motor based on the motor motion information,
wherein the motor controller is configured to determine the display region of the image object according to the motor motion information and send the display position information to the display controller, and
wherein the display controller is configured to change the display region of the image object in response to the movement of the at least one motor based on the display position information sent by the motor controller.

8. The electronic device of claim 7, wherein the motor controller is configured to calculate the display coordinates of the image object based on an identical speed and direction corresponding to the electronic device moved by the at least one motor, and send the calculated display coordinates of the image object to the display controller.

9. The electronic device of claim 2, wherein the motor controller is configured to monitor whether a driving state of the motor matches the motor motion information while driving the at least one motor that controls the movement of the electronic device, and, if the driving state of the at least one motor does not match the motor motion information, notifies the motion controller of the driving state of the motor, and
wherein, when the driving state information of the motor is received from the motor controller, the motion controller is configured to send the motor motion information changed according to the driving state of the motor to the display controller and the motor controller.

10. The electronic device of claim 1, further comprising:
a recognition engine configured to collect sensing information from one or more sensors;
an attention engine configured to extract valid data from the collected sensing information and recognizes the valid data as user behavior information;
a synchronization engine configured to map the emotion information to be expressed to an emotional expression value according to the user behavior information;
an action engine configured to receive a command as an emotional expression value; and
a motor engine configured to control the operation of the at least one motor.

11. A method for expressing emotions of a robot electronic device, the method comprising:
recognizing user behavior information based on sensing information;
identifying emotion information to be expressed by the robot electronic device based on the user behavior information;
displaying an image object having the emotion information;
determining motor motion information generated to control a movement of a display according to the emotion information;
identifying a display region of the image object displayed on the display corresponding to the motor motion information;
adjusting an operation of at least one motor embedded in the electronic device according to the motor motion information; and
changing a display region of the image object displayed on the display in response to the movement of the at least one motor.

12. The method of claim 11, further comprising:
determining, by a motion controller embedded in the electronic device, the motor motion information based on an angle, a speed, and a rotation axis direction of the at least one motor;
predicting the movement of the electronic device driven by the at least one motor in response to the motor motion information, calculating the display coordinates of the image object to move identically along the predicted movement of the electronic device;
sending the motor motion information to a motor controller; and
sending the calculated display position information of the image object to a display controller.

13. The method of claim 12, further comprising driving, by the at least one motor embedded in the electronic device, when the motor motion information is received from the motion controller, the at least one motor installed in the electronic device according to the motor motion information.

14. The method of claim 11, wherein determining display position information of an image object further comprises:
displaying, by a display controller embedded in the electronic device, when emotion information to be expressed by the electronic device is received from the motion controller, the image object indicating the emotion information on the display; and
changing, when the motor motion information is received, the display position of the image object on the display in response to the movement of the electronic device.

15. The method of claim 11, wherein determining the motor motion information further comprises:
- collecting sensing information from at least one sensor;
- recognizing user behavior information by analyzing the collected sensing information in consideration of a distance from the electronic device to a user interacting with the electronic device, a position of the user, a motion of the user, a posture of the user, a gesture of the user, or an emotional information of the user; and
- determining an emotional information of the electronic device in response to the user behavior information.

16. The method of claim 11, wherein driving at least one motor embedded in the electronic device comprises controlling a speed, an angle, and a rotation axis direction of the motor based on the motor motion information.

17. The method of claim 15, wherein changing the display position of the image object further comprises:
- calculating display coordinates of the image object based on an identical speed and direction corresponding to the electronic device moved by the at least one motor; and
- moving the image object being displayed on the display based on the calculated display coordinates.

18. The method of claim 15, further comprising:
- monitoring whether a driving state of the motor matches the motor motion information, after driving the at least one motor; and
- controlling, if the driving state of the motor does not match the motor motion information, an operation to change the movement of the at least one motor.

* * * * *